United States Patent
Sweeney

(10) Patent No.: US 7,287,984 B2
(45) Date of Patent: Oct. 30, 2007

(54) SYSTEM AND METHOD FOR PROVIDING A VISUAL LANGUAGE FOR NON-READING SIGHTED PERSONS

(75) Inventor: Wylene Sweeney, York, PA (US)

(73) Assignee: Techenable, Inc., York, PA (US)

( * ) Notice: Subject to any disclaimer, the term of this patent is extended or adjusted under 35 U.S.C. 154(b) by 692 days.

(21) Appl. No.: 10/685,102

(22) Filed: Oct. 14, 2003

(65) Prior Publication Data

US 2004/0076312 A1   Apr. 22, 2004

Related U.S. Application Data

(60) Provisional application No. 60/418,533, filed on Oct. 15, 2002, provisional application No. 60/459,063, filed on Mar. 28, 2003.

(51) Int. Cl.
*G09B 21/00* (2006.01)

(52) U.S. Cl. ........................ 434/112; 382/114

(58) Field of Classification Search ................ 434/112, 434/113, 114; 382/114, 198, 312
See application file for complete search history.

(56) References Cited

U.S. PATENT DOCUMENTS

| | | | |
|---|---|---|---|
| 3,918,029 A | 11/1975 | Lemelson | |
| 4,275,381 A | 6/1981 | Siegal | |
| 4,283,622 A | 8/1981 | Passer et al. | |
| 4,323,772 A | 4/1982 | Serge | |
| 4,329,574 A | 5/1982 | Jordan, Jr. | |
| 3,918,029 A | 3/1992 | Lemelson | |
| 5,169,342 A | 12/1992 | Steele et al. | |
| 5,243,655 A | 9/1993 | Wang | |
| 5,480,306 A * | 1/1996 | Liu | 434/156 |
| 5,710,417 A | 1/1998 | Joseph et al. | |
| 5,713,740 A * | 2/1998 | Middlebrook | 434/178 |
| 5,982,911 A | 11/1999 | Matsumoto et al. | |
| 6,229,139 B1* | 5/2001 | Neukermans et al. | 250/236 |
| 6,437,875 B1 | 8/2002 | Unno | |
| 6,460,056 B1* | 10/2002 | Horii | 715/500.1 |
| 6,542,623 B1 | 4/2003 | Kahn | |
| 6,621,070 B2 | 9/2003 | Ahten et al. | |
| 6,625,613 B2 | 9/2003 | Thompson | |

\* cited by examiner

*Primary Examiner*—Jingge Wu
*Assistant Examiner*—Sean Motsinger
(74) *Attorney, Agent, or Firm*—Duane Morris LLP

(57) ABSTRACT

A method and system for communicating to sighted persons who cannot read a standard alphanumeric text, the informational content of that text includes an alphanumeric text is converted to a machine-readable set of informationally corresponding data, and then scanned to obtain an informational content data set. The informational content data set is then correlated with hieroglyphs that are representative of the actions, physical objects and the relationship between the actions and the physical objects presented by the informationally corresponding data set. The one or more hieroglyphs are then syntactically arranged to pictorially represent the informationally corresponding data set for a sighted person thereby to inform them of the actions, physical objects and the relationship between those actions and physical objects as was originally presented in the standard alphanumeric text.

13 Claims, 20 Drawing Sheets

Inventory

Pack

SYSTEM AND METHOD FOR PROVIDING A VISUAL LANGUAGE FOR NON-READING SIGHTED PERSONS

This Application claims priority from Provisional Patent Applications Ser. No. 60/418,533, filed Oct. 15, 2002, and Ser. No. 60/459,063, filed Mar. 28, 2003.

FIELD OF THE INVENTION

The present invention generally relates to communications systems for non-reading sighted persons and, more particularly, to a system and method for providing a visual language for non-reading sighted persons such as the cognitively disabled.

BACKGROUND OF THE INVENTION

The Braille format was devised to enable the blind or visually impaired to read alphanumeric characters using their sense of touch. Braille is presented in "cells" of dots raised above the surface of the reading material in unique patterns so that a sight-impaired person may simply brush their fingers across the field of dots to feel the pattern of dots and thereby "read" the letters represented therein. Initially each Braille cell consisted of six dots, arranged in two columns of three dots each. Each alphanumeric character is represented by a unique set or pattern of six raised dots in the cell. Because of the number of combinations possible in a six-dot cell is limited to sixty-three, the cell has been expanded to eight dots, by adding two dots at the bottom, to form two columns of four dots. Braille recognition technology is known in the art that optically scans the projecting Braille dots, recognizes the pattern, and associates it with a particular alphanumeric character, via a computer, so that Braille texts may be read via the computer's user interface to persons without sight. Braille code on printed matter is often referred to as being in "India-ink". U.S. Pat. Nos. 5,243,655; 5,982,911; 5,710,417; 5,169,342, and 6,625,613 disclose various devices and methods for recognizing and interpreting Braille text. Braille does not aid the sighted person who cannot read alphanumeric text do to illiteracy or a cognitive disability.

Bar code labels are known to comprise a series of parallel dark bars of varying widths with intervening light spaces, also of varying widths. The information encoded in the bar code is represented by the specific sequence of bar and space widths, the precise nature of this representation depending on the particular bar code symbology used. Methods for reading bar codes may comprise generation of an electronic signal wherein a signal voltage alternates between two preset voltage levels, one representing a dark bar and the other representing a light space. The temporal widths of these alternating pulses of high and low voltage levels correspond to the spatial widths of the bars and spaces. It is this temporal sequence of alternating voltage pulses of varying widths which is presented to an electronic decoding apparatus for decoding. Prior art bar code scanners are typically operated in one of two modes, fixed or handheld. In the fixed mode of operation, objects with bar codes thereon are moved to or past a stationary bar code scanner for scanning. In the handheld mode of operation, a portable bar code scanner is typically oriented and/or moved to the bar code label to be read. Examples of various bar codes and bar code readers are shown in U.S. Pat. Nos. 3,918,029; 4,275,381; 4,283,622; 4,323,772; and 4,329,574. Bar codes are not used in combination with one another to form symbolic representations of thought or alphanumeric text, nor can they be used effectively to communicate instructions to the sighted person who cannot read alphanumeric text do to illiteracy or a cognitive disability.

Non-reading sighted persons may be illiterate or be afflicted with a cognitive disability that prevents or impedes their ability to receive information through reading standard alphanumeric text or Braille code. Braille was designed and intended to be read by sightless persons, while bar code symbologies were designed to be machine generated and machine readable. In the case of bar codes, they must be printed with standard alphanumeric text (or Braille code) in order for the underlying information to be readable to a person.

Graphic languages have been used to communicate with language deficient persons, and graphic user interfaces have been the standard for user interfaces on personal computers and the internet. Braille has not been translated to graphics for persons with sight who can not read text, nor have bar code technologies been used to facilitate communication between humans and machine, or to enhance human reading ability.

As a consequence, there has been a long felt need for a graphic language combined with machine vision technologies to generate a new visual language for non-reading sighted persons such as the cognitively disabled.

SUMMARY OF THE INVENTION

The present invention provides a method and system for communicating to sighted persons who cannot read a standard alphanumeric text, the informational content of that text. In its most general aspects, a method is provided in which an alphanumeric text is converted to a machine-readable set of informationally corresponding data, and then scanned or otherwise read so as to obtain an informational content data set. The informational content data set is then correlated with one or more hieroglyphs that are representative of the actions, physical objects and the relationship between the actions and the physical objects presented by the informationally corresponding data set. The one or more hieroglyphs are then syntactically arranged to pictorially represent the informationally corresponding data set for a sighted person thereby to inform them of the actions, physical objects and the relationship between those actions and physical objects as was originally presented in the standard alphanumeric text.

The present invention also provides a system for converting alphanumeric text into a machine readable Braille, reading that machine readable Braille, and then using a relational database to associate the information content of the machine readable Braille with one or more conventionalized pictures or symbols (hieroglyphs) that are representative of actions, physical objects and the relationship between the actions and the physical objects presented by the alphanumeric text so as to syntactically arrange and correlate a series of the hieroglyphs to pictorially represent the actions, physical objects and the relationship between those actions and physical objects as was originally presented in the standard alphanumeric text.

BRIEF DESCRIPTION OF THE DRAWINGS

These and other features and advantages of the present invention will be more fully disclosed in, or rendered obvious by, the following detailed description of the preferred embodiment of the invention, which is to be considered together with the accompanying drawings wherein like numbers refer to like parts and further wherein.

DESCRIPTION OF PREFERRED EMBODIMENTS

Figure 1:
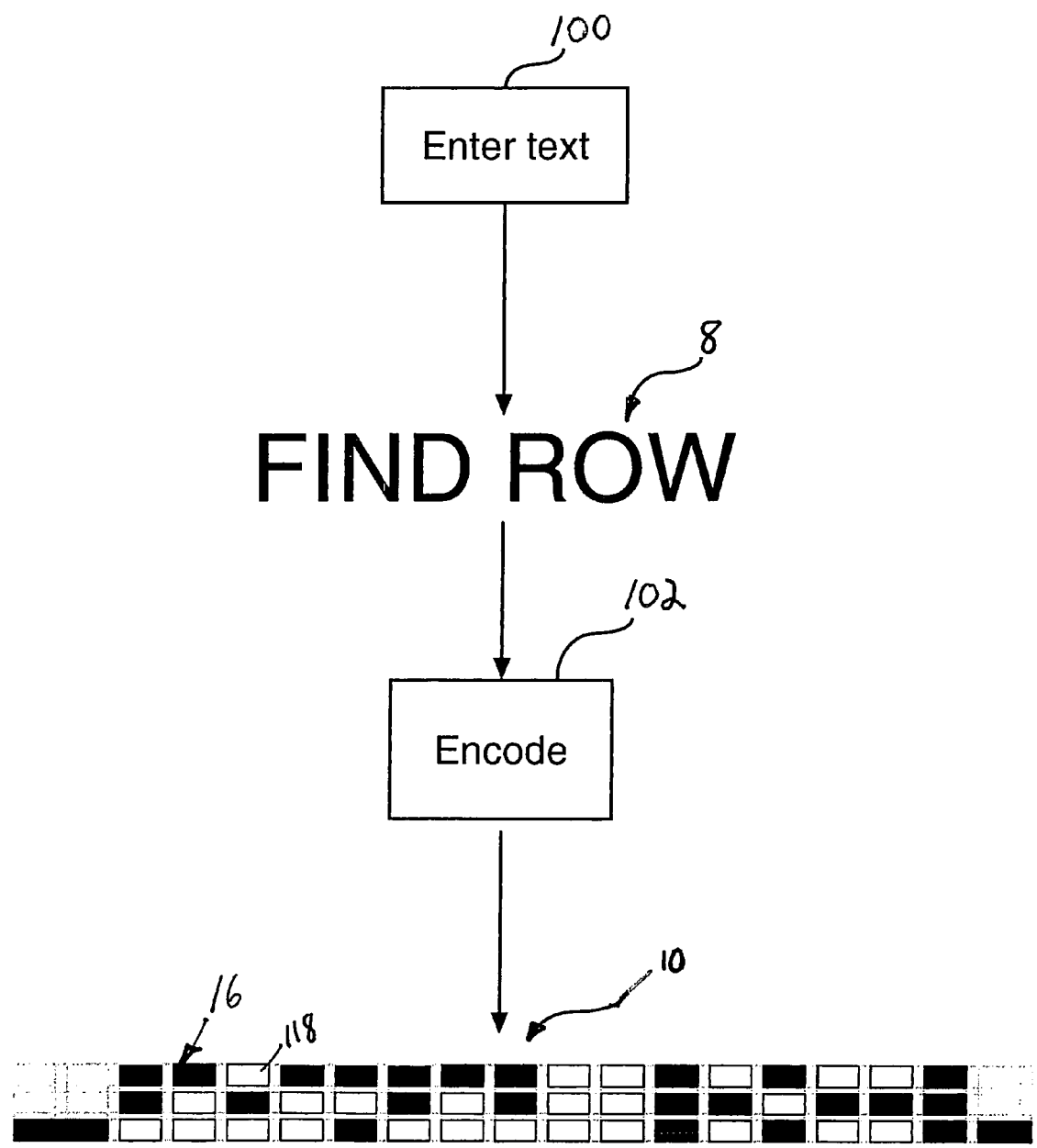
FIG. 1 is a schematic representation of a portion of a system for converting alphanumeric text into a machine readable Braille in accordance with an embodiment of the invention.

This description of preferred embodiments is intended to be read in connection with the accompanying drawings, which are to be considered part of the entire written description of this invention. The drawing figures are not necessarily to scale and certain features of the invention may be shown exaggerated in scale or in somewhat schematic form in the interest of clarity and conciseness. In the claims, means-plus-function clauses are intended to cover the structures described, suggested, or rendered obvious by the written description or drawings for performing the recited function, including not only structural equivalents but also equivalent structures.

Referring to FIGS. 1-7, the present invention provides a communication method and system 5 for communicating with sighted persons who cannot read standard alphanumeric text 8. In its most general aspects, alphanumeric text 8 is converted to a machine-readable set of informationally corresponding data 10, and then scanned or otherwise read so as to obtain an informational content data set 12. Informational content data set 12 is then correlated with one or more hieroglyphs 19 that are representative of the actions, physical objects and the relationship between the actions and the physical objects presented by informationally corresponding data set 12. Hieroglyphs 19 may also include labels and signs. One or more hieroglyphs 19 are syntactically arranged to pictorially represent informationally corresponding data set 12 for a sighted person so as to inform them of the actions, physical objects and the relationship between those actions and physical objects as was originally presented in standard alphanumeric text 8.

A system according to the invention provides for converting alphanumeric text 8 into a machine readable Braille (corresponding to informationally corresponding data 10) reading that machine readable Braille 10, and then using a relational database 20 to associate informationally corresponding data set 12 with one or more hieroglyphs 19 that are representative of actions, physical objects and the relationship between the actions and the physical objects presented by the alphanumeric text 8. In one embodiment, the invention comprises a Braille code symbology 16, code & symbology interpreting software 13, and a comic & sequential art symbology (hieroglyphs) 19. More particularly, Braille code symbology 16 comprises a two dimensional pattern of light and dark dots arranged according to conventional Braille code, e.g., a plurality of unique patterns of black and white dots that are organized in a six-cell matrix 21 so as to represent alphanumeric characters, and that are each suitable for recognition as a binary character. Conventional Braille code has a different pattern of raised bumps for each alphanumeric character. Braille symbology 16 provides a machine-readable pattern, i.e., flat, that can be read by, e.g., an optical scanner, and thereby deliver all of the information originally presented by the corresponding alphanumeric text 8.

The information encoded in six-cell matrix 21, e.g., a single alphanumeric symbol, is represented by the specific pattern of black dots and white dots, the precise nature of this representation depending upon standard Braille code symbology. Methods for reading Braille symbology 16 may comprise generation of an electronic signal wherein a signal voltage alternates between two preset voltage levels, one representing a black dot and the other representing a white dot. These alternating pulses of high and low voltage levels correspond to the presence or absence of black and white dots in a scan line. It is this sequence of alternating voltage pulses which is presented to an electronic decoding apparatus for decoding and creation of informationally corresponding data set 12. Binary detection by an optical scanner is facilitated by adopting matrices 21 of black or white dot-squares that represent one and zero, and are arranged according to the conventional Braille patterns. A plurality of six-cell matrices 21 are provided based upon a standard set of ASCII characters, and can be printed by conventional ink jet and laser printers as Braille code symbology 16.

Figure 2:
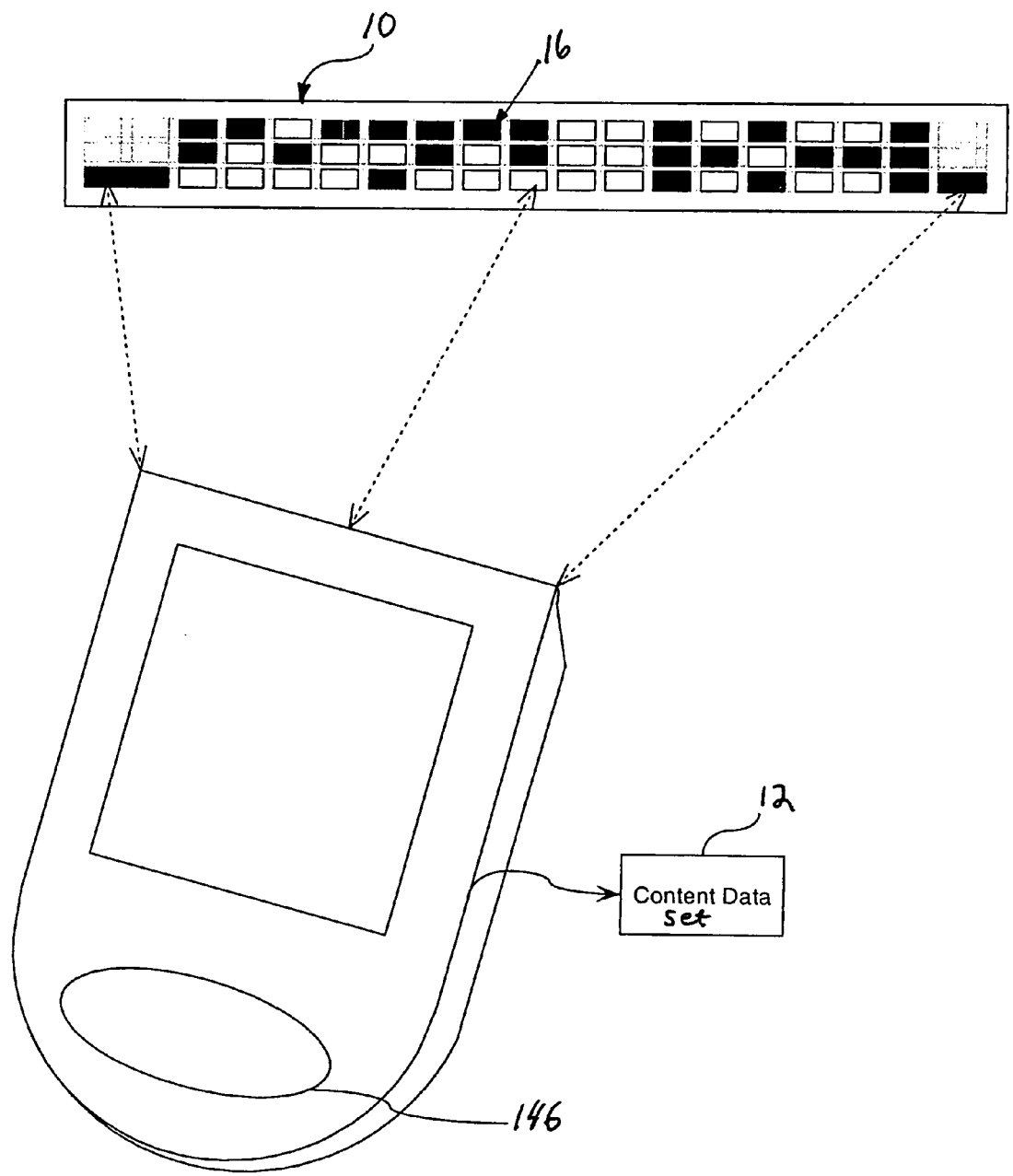
FIG. 2 is a perspective view of an optical scanner reading machine readable Braille in accordance with an embodiment of the invention.
Figure 3:
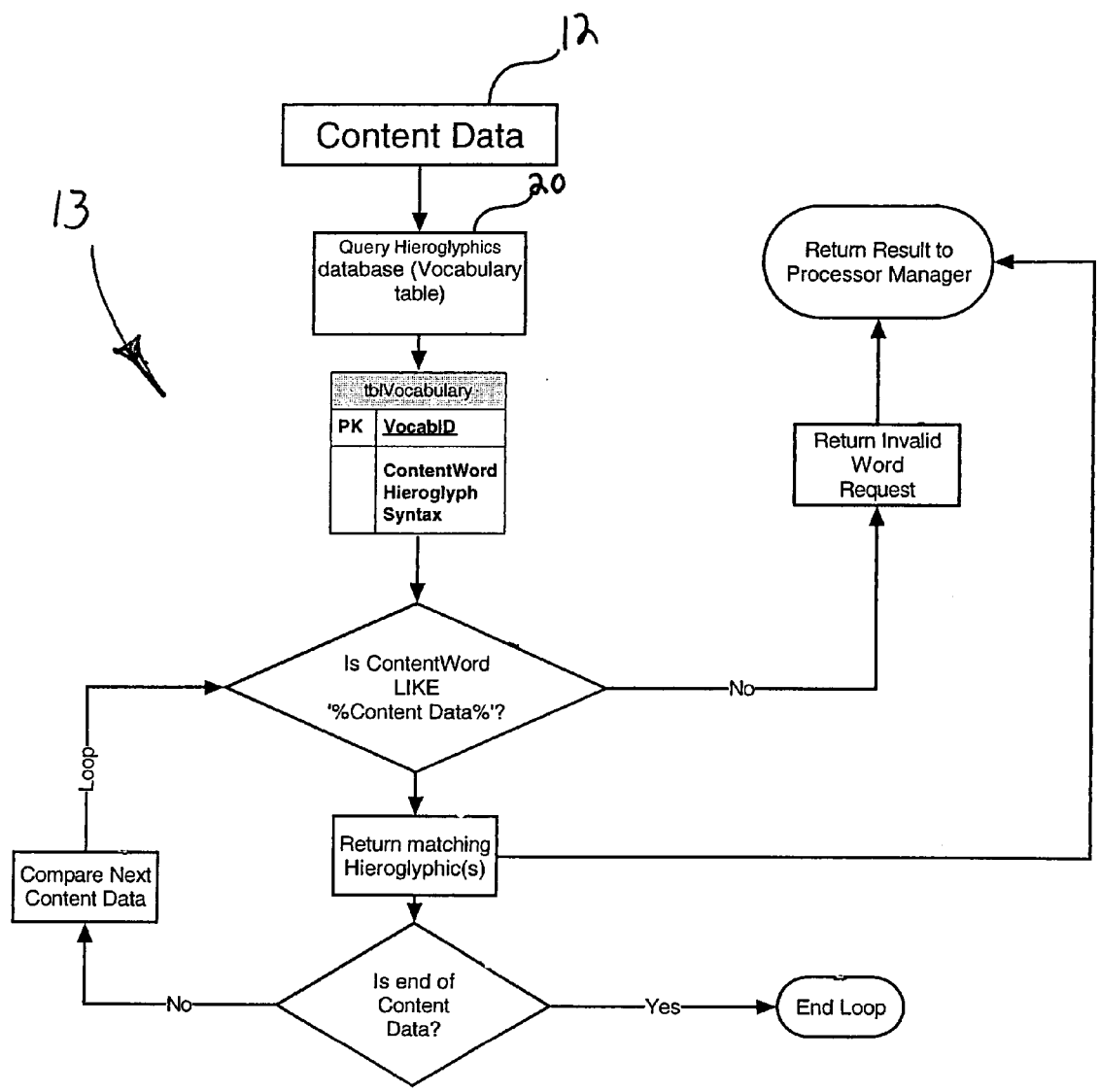
FIG. 3 is a schematic representation of one process for using a relational database to associate the information content of the machine readable Braille with one or more conventionalized hieroglyphs.
Figure 4:
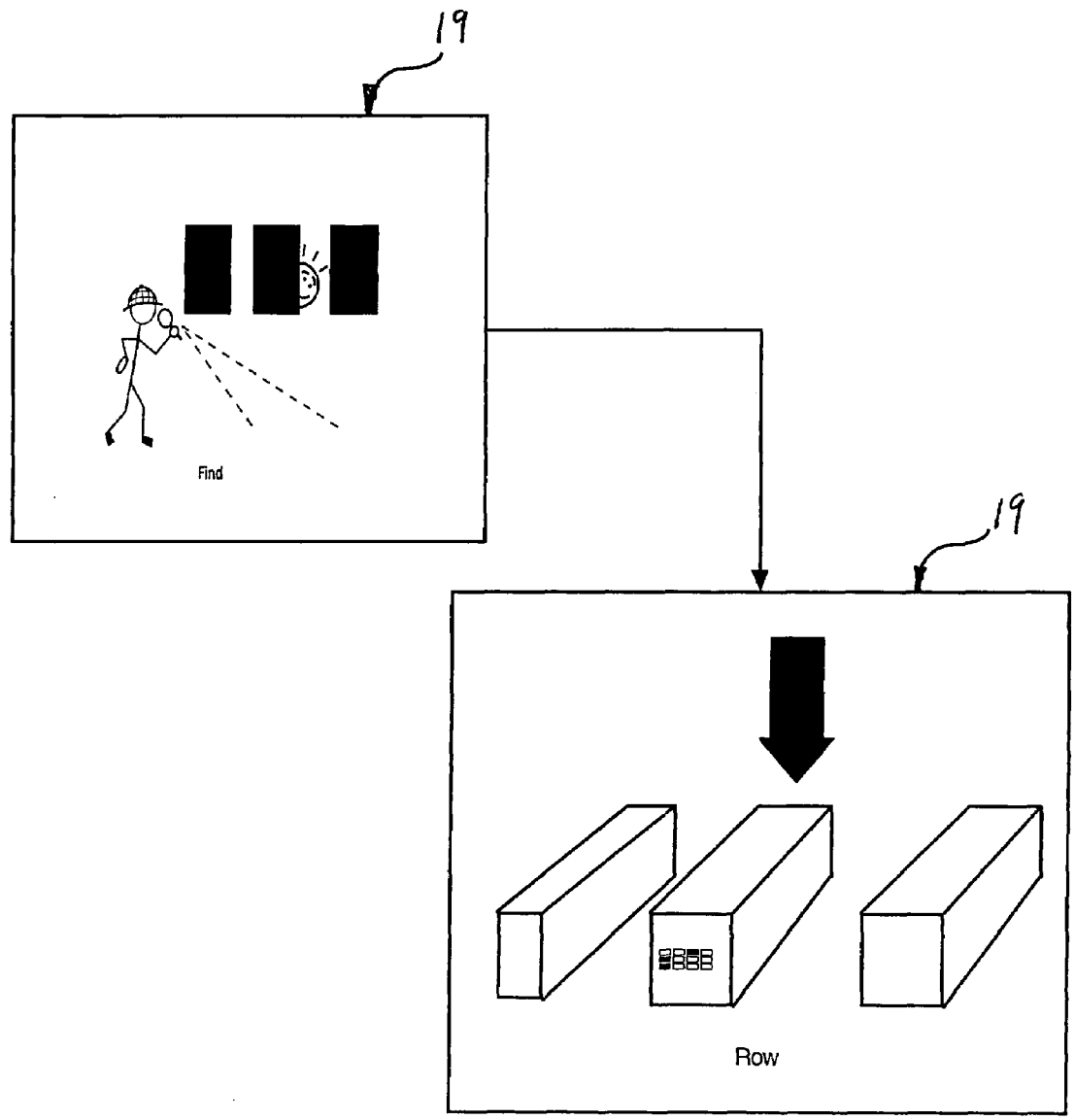
FIG. 4 is an illustration of one or more conventionalized hieroglyphs that are representative of actions, physical objects and the relationship between the actions and the physical objects presented by the alphanumeric text that may be syntactically arranged to pictorially represent the actions, physical objects and the relationship between those actions and physical objects as was originally presented in the standard alphanumeric text.
Figure 5:
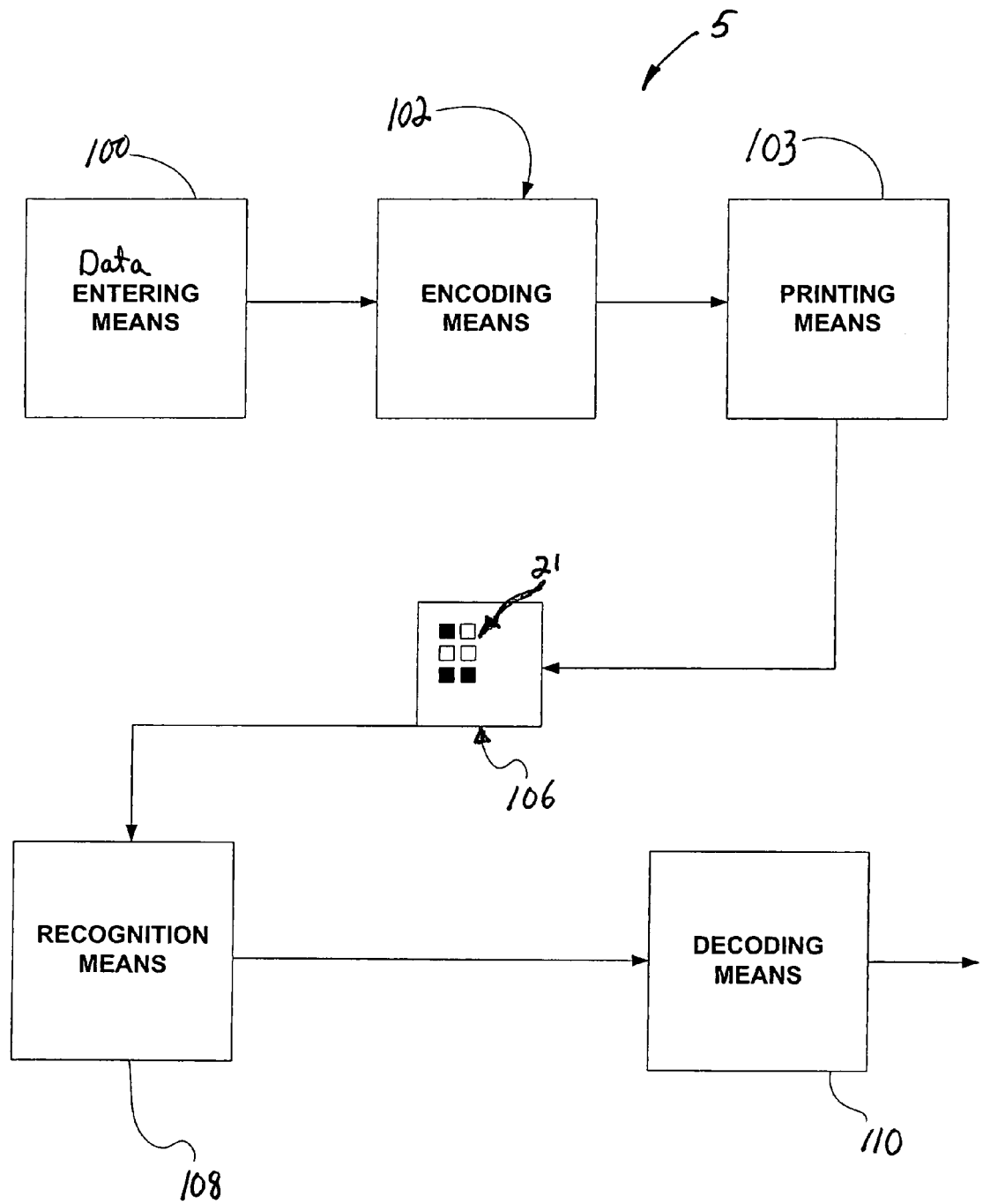
FIG. 5 is a block diagram of a system formed in accordance with the present invention for creating an information content data set from an alphanumeric text.
Figure 6:
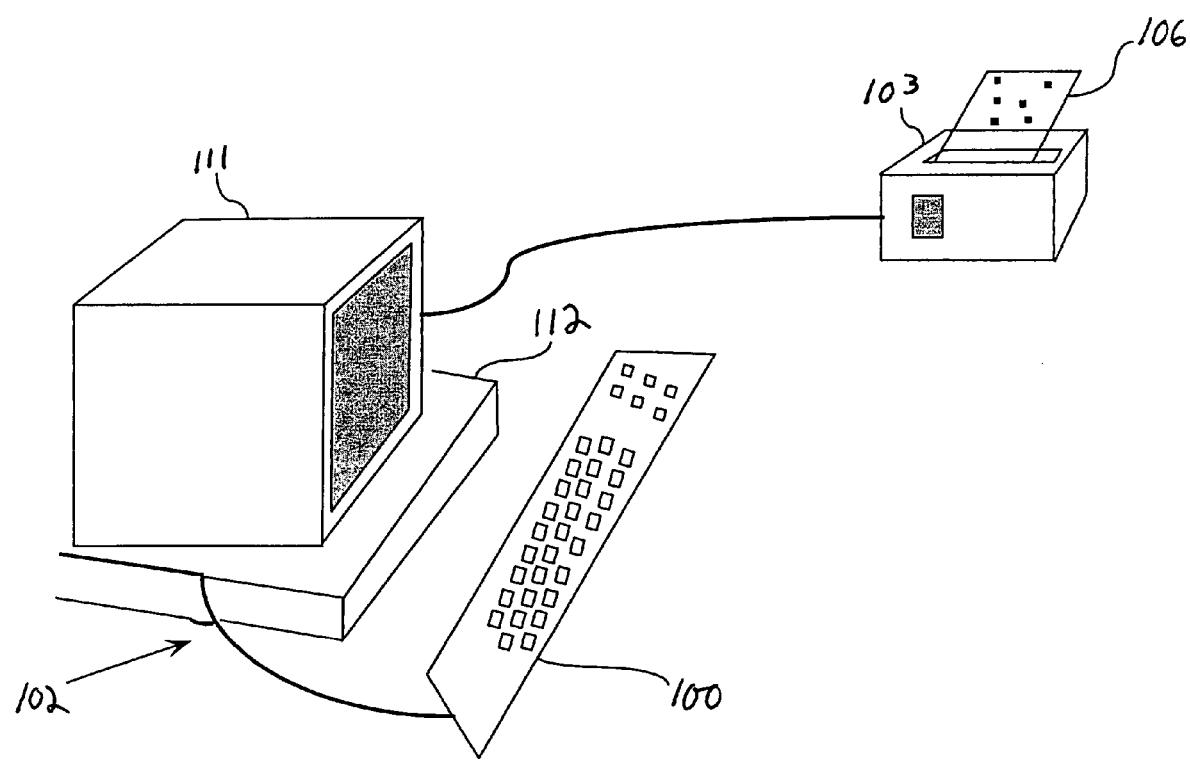
FIG. 6 is a perspective view of an encoding means of the system of Braille code.
Figure 7:
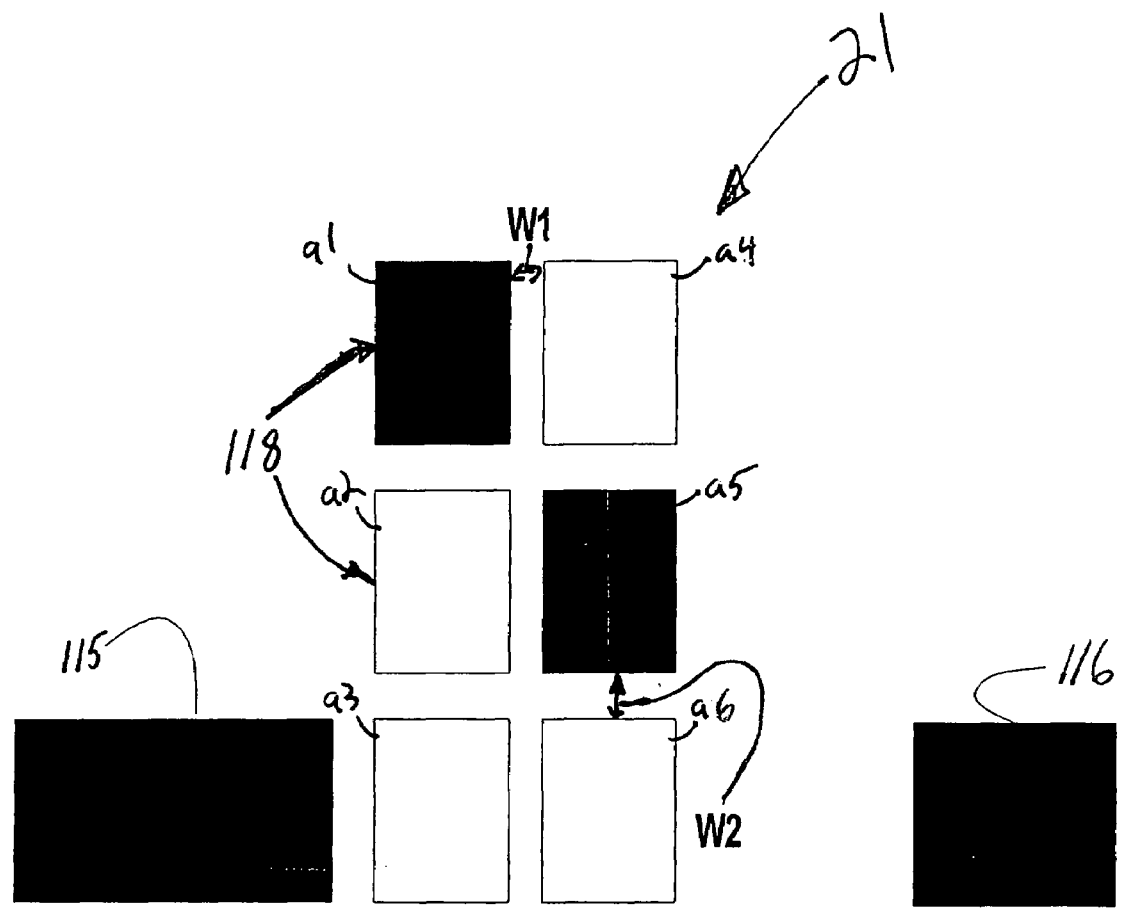
FIG. 7 is a representation of one embodiment of a dot-square matrix of the type contemplated for use with the present invention.
Figure 8:
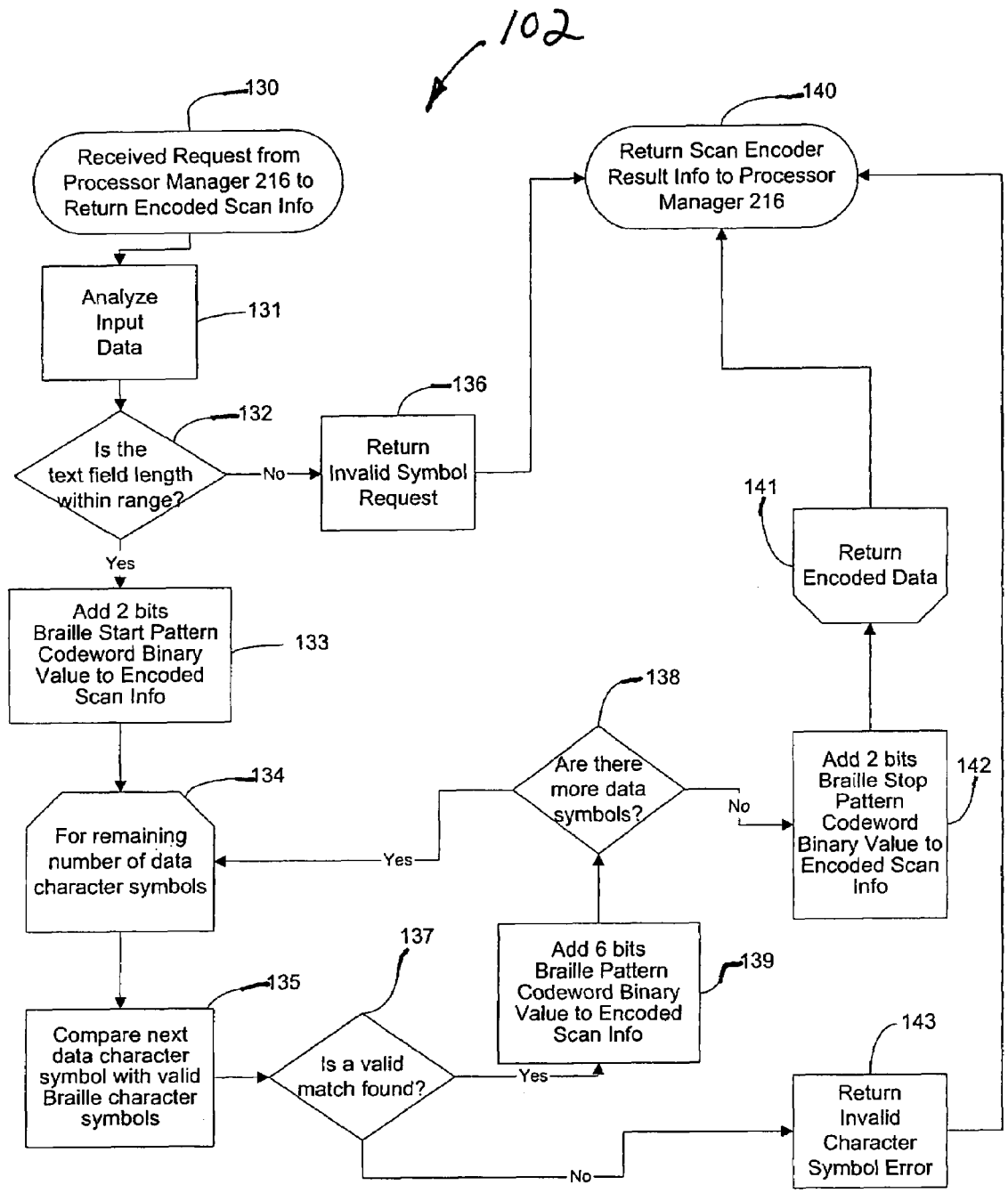
FIG. 8 is flow chart of the encoding process for Braille code.

Referring to FIGS. 1, 2, and 7, in one embodiment of the present invention is provided a Braille code symbology 16 is provided in the form of "India-ink" Braille code symbology 16 which are optically scanable and thereby machine-readable. The system often includes data entering means 100, encoding means 102, recognition means 108, and decoding means 110. Data entering means 100, e.g., a keypad, optical scanner, or magnetic card reader, are arranged in signal communication with encoding means 102 so as to create media 106 that display one or more cell matrices 21 of Braille code symbology 16. Recognition means 108 scans Braille code symbology 16 and produces one or more output signals that replicate the data encoded by encoding means 102.

Recognition means 108 convert Braille code symbology 16, via decoding means 110 into information content data set 12.

A processing device 112, e.g., a personal computer, PDA, or the like computing device of the type known in the art, may be used in conjunction with encoding means 102 to encode alphanumeric text 8 as a plurality of matrices 21. Of course, it will be understood that data to be encoded may be retrieved from computer memory files as well as being entered by data entering means 100. A display unit 111 may be employed, such as liquid crystal display or a CRT. In one embodiment, processing device 112 generates print signals for controlling a conventional printer 103 so as to print matrices 21 onto media 106, e.g., a sheet of paper. Printer 103 may also print Braille code symbology 16 with magnetic-ink so that it may be recognized by magnetic-ink recognition sensors forming a portion of recognition means 108.

Referring to FIG. 7, a typical dot matrix 21 of the type contemplated for use with the present invention (often referred to as a "codeword" 114) comprises two columns of dot-squares 118 by three rows of dot-squares 118 forming a single character unit or codeword 114. Each individual dot-square 118 may be identified by a reference character a1, a2, a3, a4, a5, a6 for ease of manipulation as a portion of the data analysis software program. Each character of alphanumeric text 8 to be read may be represented as a unique combination of dot-squares 118, i.e., a unique combination of one to six black dot-squares and one to six bordered white dot-squares. A lateral spacing W1 is defined between adjacent dot-squares a1, a4 a2,a5 and a3,a6 for each codeword 114. A longitudinal spacing W2 is defined between a6 and a5, a5 and a4, a3 and a2, and a2 and a1 for each codeword 114. Braille characters are read from left to right so that a string of codewords 114 (matrices 21) may be positioned adjacent to one another with a start pattern 115 and a stop pattern 116 positioned therebetween to indicate the beginning and end of each string of codewords 114.

Figure 9:
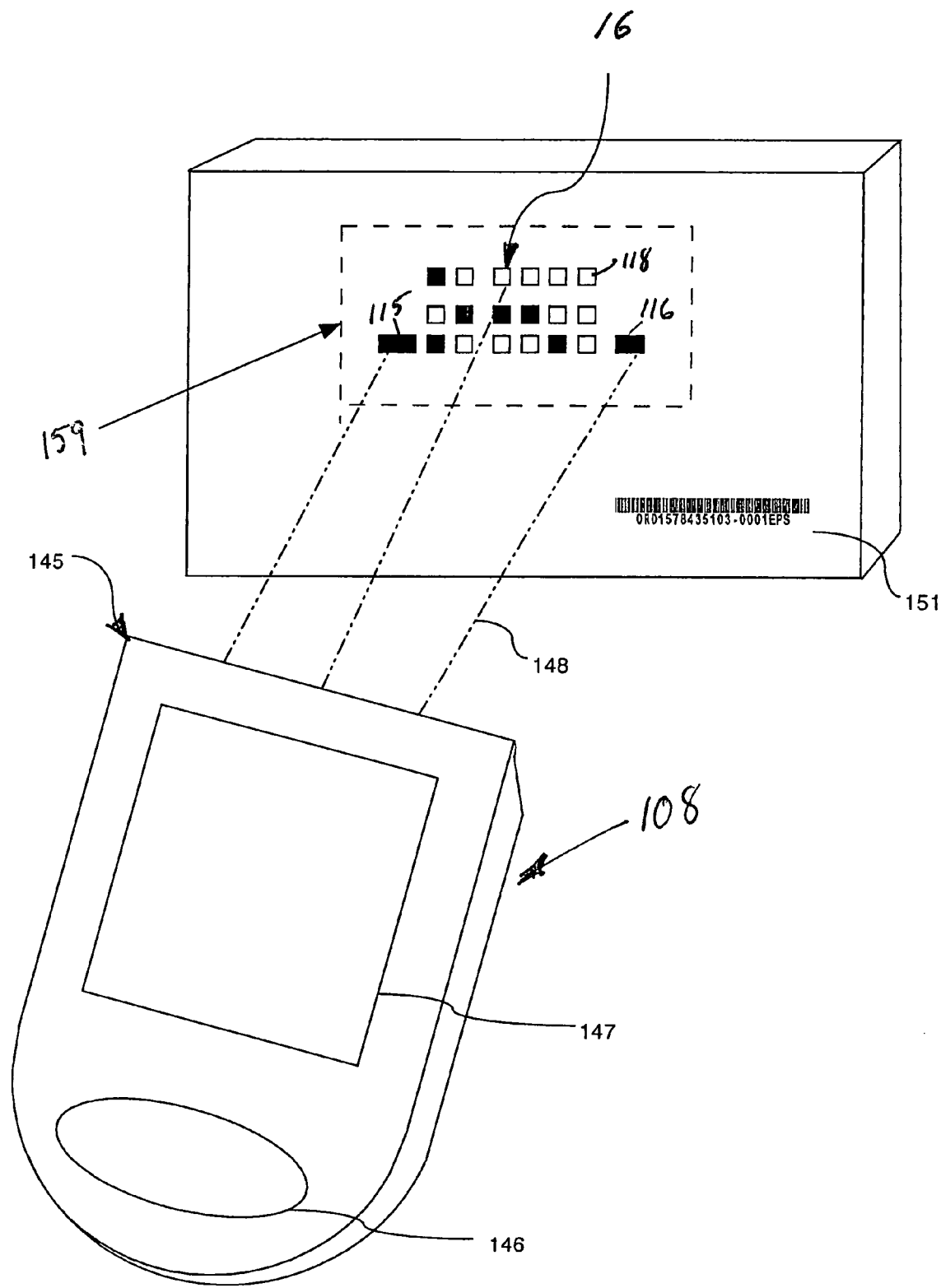
FIG. 9 is a schematic view of a scanner reading a sheet of paper containing machine readable Braille.

Encoding means 102 processes alphanumeric text 8 by entering it into the system using entering means 100 (FIG. 9). A request 130 is sent from a Processor Manager 216 (FIG. 15) to get the data to be encoded. The data is tested against a specified text image length requirement 132. The factors determining the image length requirement include, but are not limited to, the dpi resolution and capabilities of printing means 103. If the test fails, encode request 130 is denied and returned to encoding means 100, along with a notice to Processor Manager 216. If the test is successful, the encoding processing continues by adding two bit Braille start pattern Code word 115 to encoded scan data 133 then the remaining number of data character symbols 134 are compared with standard Braille character symbols in section 135. The data to be encoded is compared in section 135 with standard codeword values. Comparison test 137 determines whether a valid match is found in section 137. If comparison test 137 fails, the request is denied and section 143 returns the data to Processor Manager 216 as invalid. If comparison test section 137 test is successful, the encoding process continues to create a codeword 114 at section 139. The data is evaluated for additional character symbols at section 138. If the evaluation yields no more character symbols, a stop pattern codeword 116 is inserted at section 142 and encoded data 141 is returned to processor manager 216. If the evaluation yields additional character symbols, the process loops at section 134 to continue the encoding of the additional character symbols until this loop terminates and returns to Processor Manager 216.

Referring to FIG. 9, recognition means 108 often comprises a handheld scanning unit 145 comprising a scanner with a digital signal processor, DSP, and a handheld computer. A display screen 147 may be included, and may comprise a liquid crystal display, touch receptive pad, or a scan trigger 146 as an input means. Handheld unit 145 has a two dimensional image processing capability and is capable of recognizing and decoding Braille code symbology 16.

Figure 10:
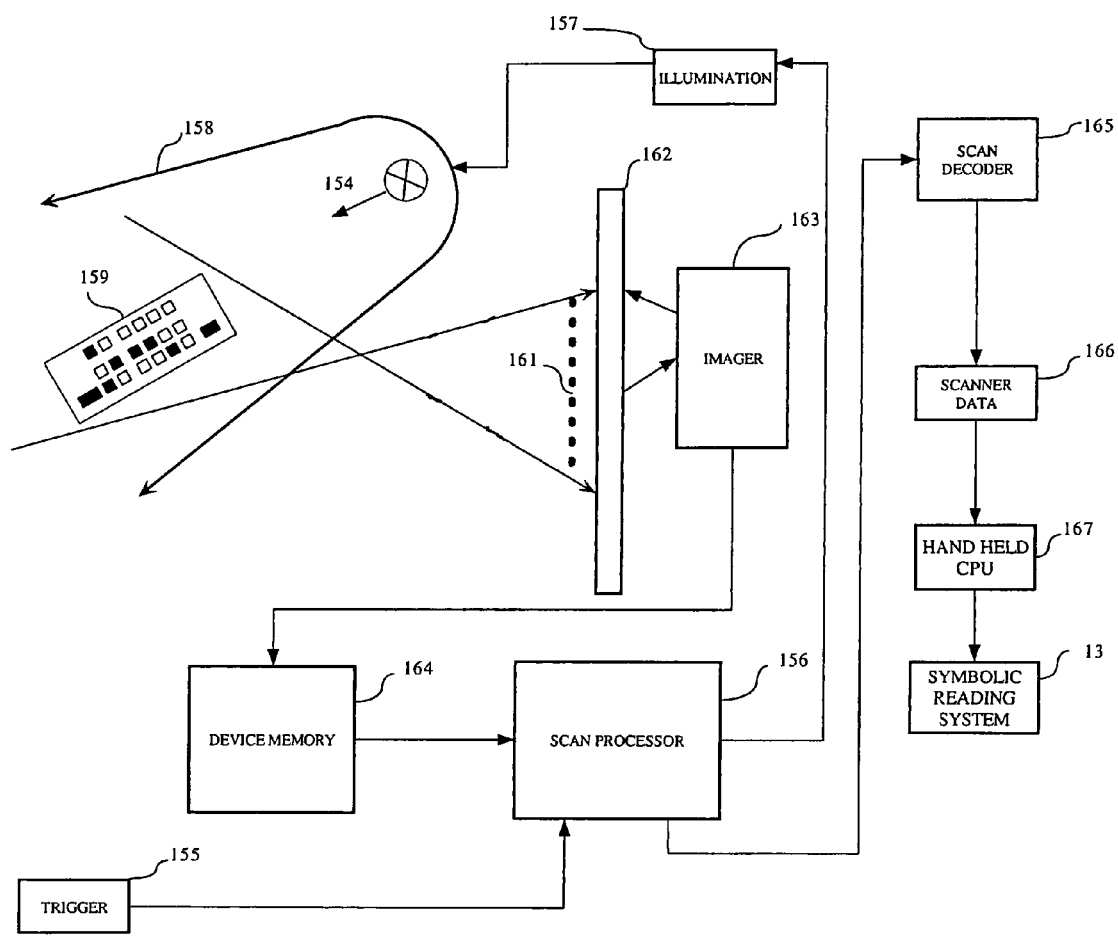
FIG. 10 is a schematic representation of a first portion of a decoding and recognition system formed in accordance with the present invention.

Referring to FIG. 10, an electronic imaging and decoding process using a handheld scanner 145 with a digital signal processor (DSP) and a handheld computer in accordance with one embodiment of the invention starts when an end-user activates a scan trigger 146 to start the electronic imaging process. Scan trigger 146 initiates a request to scan processor 156 to launch illumination system 157 which illuminates target image 159 (i.e., a sheet of paper containing Braille code symbology 16). Light is reflected from image 159 through a lens system and focused onto two dimensional imager 162. Two dimensional imager 162 sends image data to interface imager 163. The image data is stored in a device memory 164. A scan processor 156 retrieves image data from device memory 164 and decodes the image data using a scan decode process 165 which returns decoded scanner data to handheld CPU 167, where it is graphically and syntactically interpreted for end-users 203 with the code & symbology interpreting software 13. Illumination system 157 may include an LED or Visible-sight laser Diode. In other embodiments, two dimensional imager 162 may include a CCD imager. Illumination system 157 may also include a flash lamp.

Code & symbology interpreting software 13 interprets scanned Braille code symbology 16 as an informationally corresponding data set 10, and converts that data set into syntactically corresponding visual narrative comprising one or more hieroglyphs 19 that sighted persons who cannot read a standard alphanumeric text can interpret. In this way, these persons will be assisted in navigating their physical environment or completing needed tasks in a work environment. More particularly, code & symbology interpreting software 13 cross-references informationally corresponding data set 10 with a relational database that stores a wide variety of hieroglyphs 19 that may be presented to a sighted person who cannot read a standard alphanumeric text as symbolic representations of nouns and verbs in graphic form.

Figure 11:
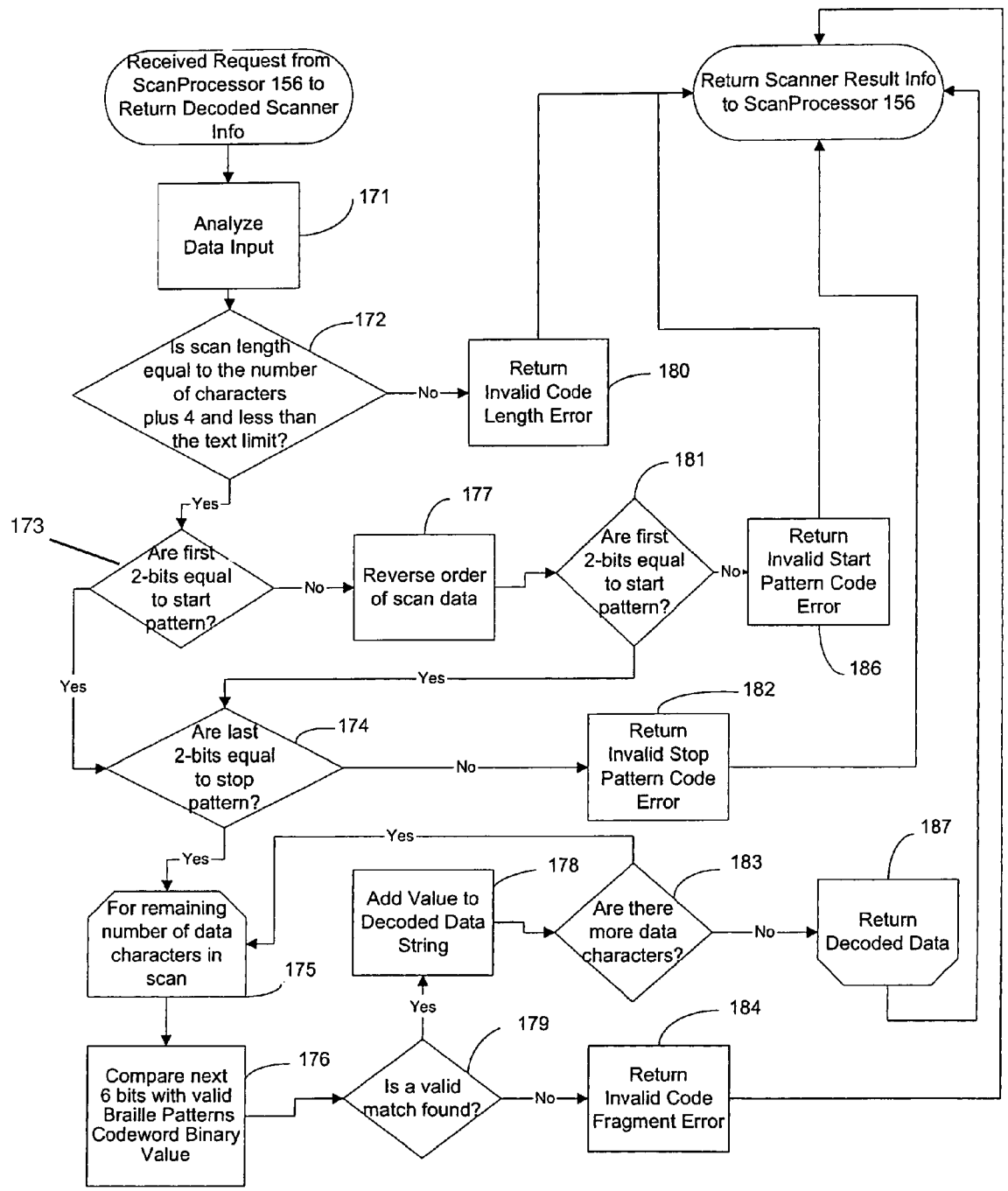
FIG. 11 is a flow chart of the decoding process for Braille code.

Referring to FIG. 11, the decoding and interpretation process starts with the transmission of image data (i.e., informationally corresponding data set 12) from device memory 164 to scan processor 156 as decoded scanner data 166 (FIG. 7).

The image data is analyzed at section 171 by testing its length against a specified text length requirement 172, e.g.

a length equal to the number of characters plus four, but less than a text limit. The factors determining the image length requirement specified include, but are not limited to, pixel resolution and capabilities of handheld unit 145. If length test 172 fails, then an invalid code error 180 is returned to scan processor 156. If the test succeeds, the image data is tested at section 173 for a start pattern 115, e.g., the first two bits are checked. If the test fails, a reverse order process 177 starts. The image data is once again tested for start pattern 115 in section 181. If the test at section 181 fails, an error invalid start pattern 186 is returned to scan processor 156. If the test succeeds, the image data is evaluated for a stop pattern 116 at section 174. If the test fails, an error of invalid stop pattern 182 is returned to scan processor 156.

If the test succeeds, the decoding process continues at section 175. The image data to be decoded is then compared with conventional standard Braille codeword values at section 176. If comparison test 179 fails, an invalid code fragment error 184 is returned to scan processor 156. If the test is successful, the decoding process continues to decrypt the image data at section 178 and is evaluated for additional image data at section 183. If the evaluation yields no more image data, decrypted data is returned by section 187 to scan processor 156. If the evaluation yields additional image data, the process loops to continue decoding of the additional image data until this loop terminates.

Figure 12:
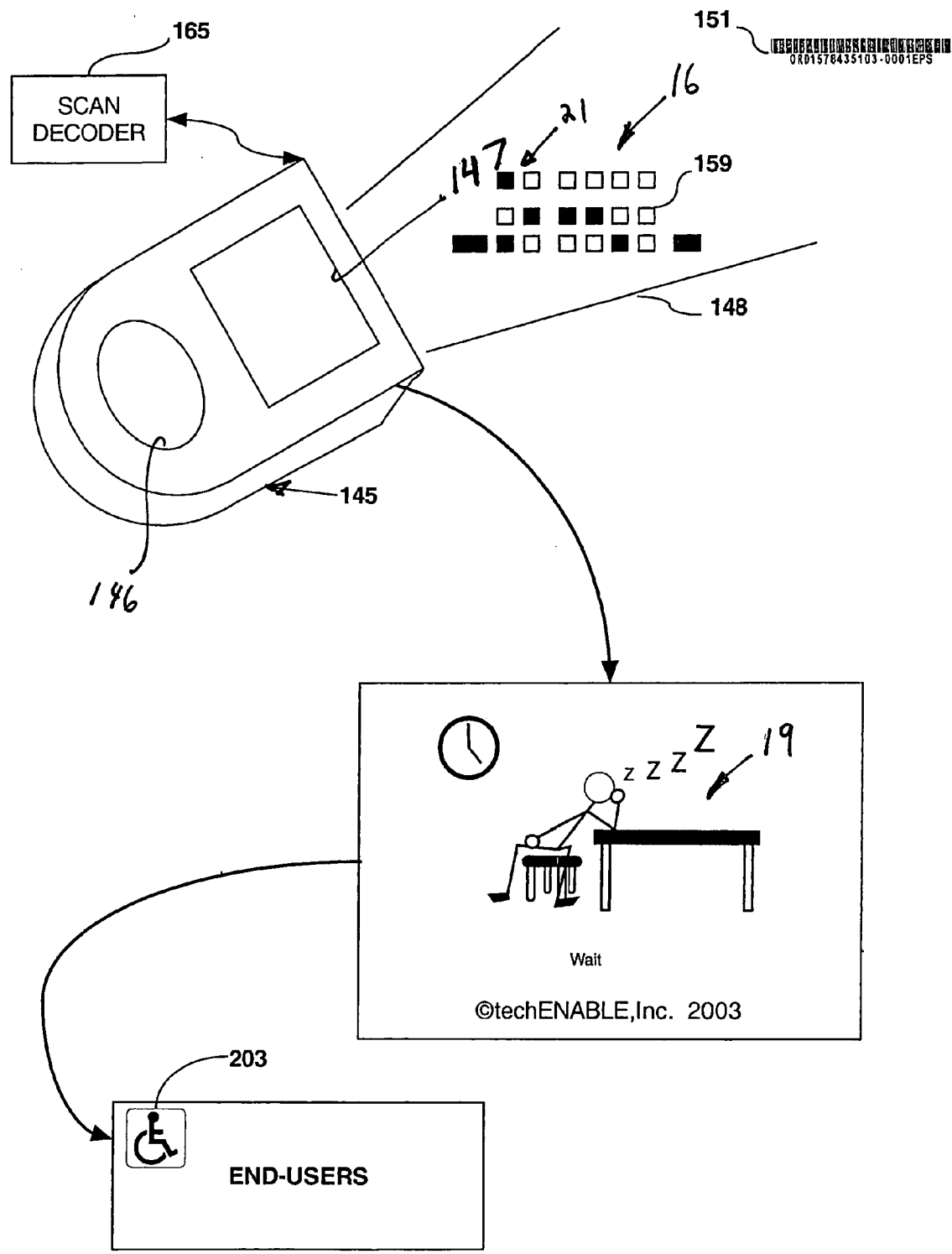
FIG. 12 is a schematic diagram of a scanning and decoding system forming a hieroglyph for presentation to an end-user in accordance with the present invention.
Figure 13:
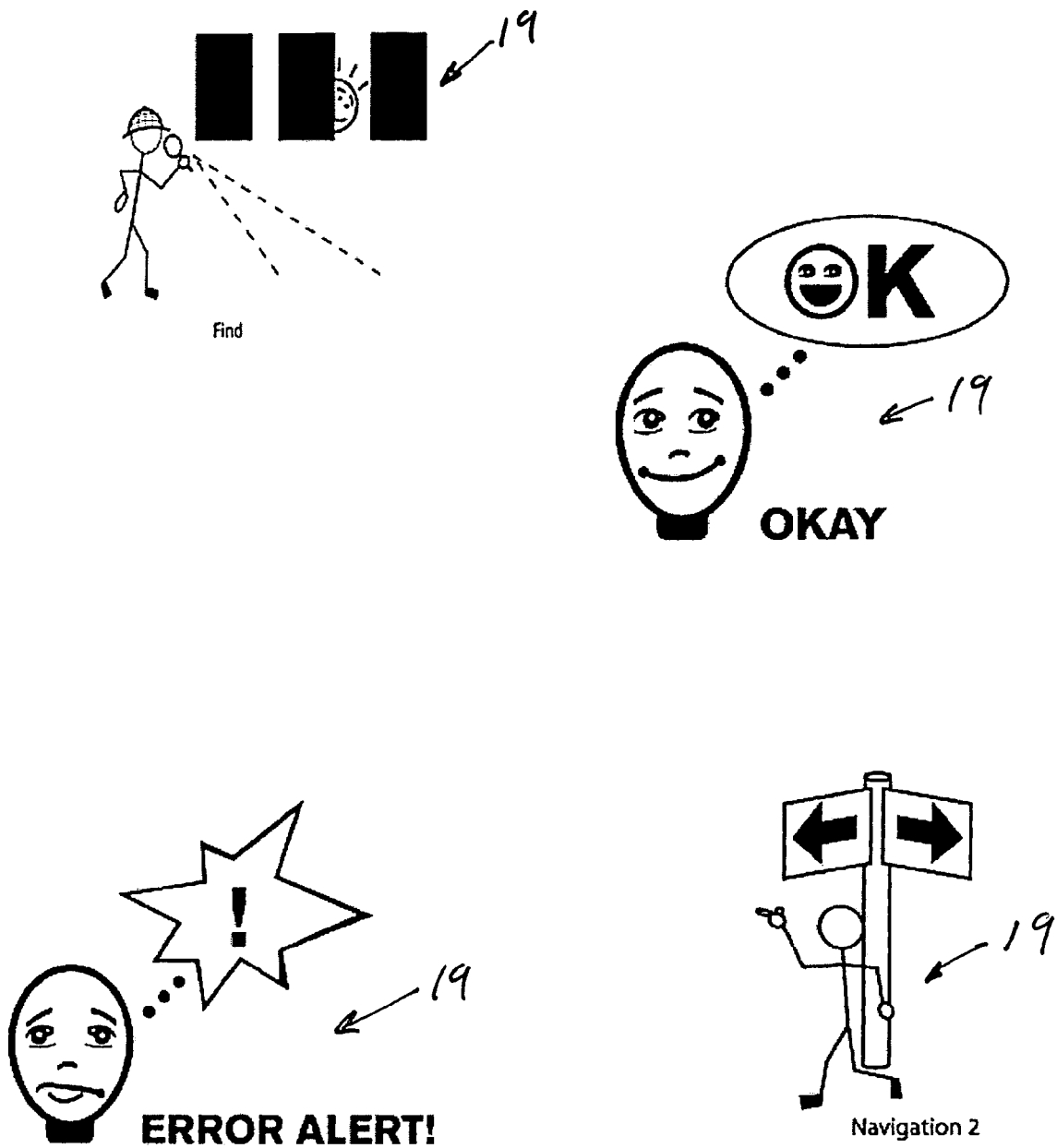
FIG. 13 is an illustration of graphic vocabulary for Symbolic reading system.
Figure 14:
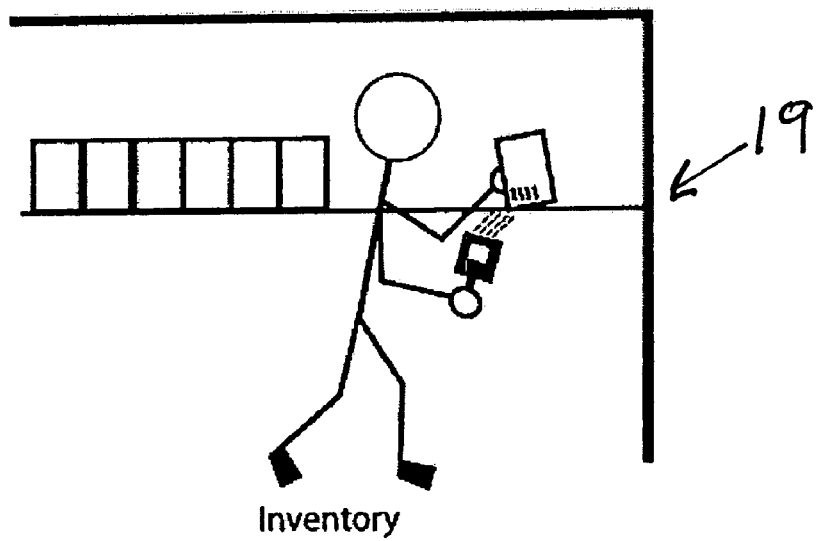
FIG. 14 continues the illustration of graphic vocabulary for Symbolic reading system.
Figure 14:
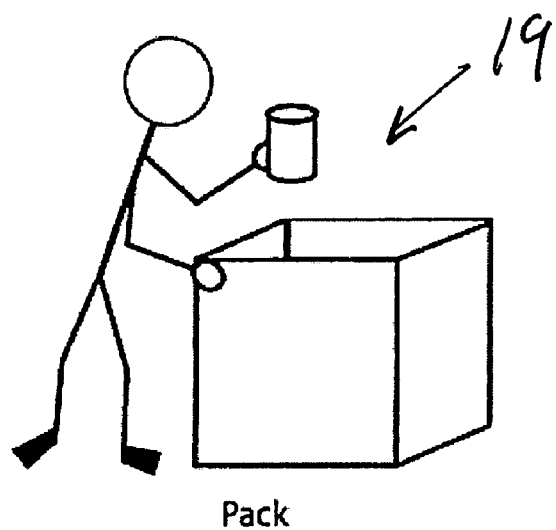

Referring to FIG. 12, handheld unit 145 decodes a Braille code 159 or bar code image 151. Scanner data 166 is processed by user interface 100 and one or more hieroglyphs 19 are displayed that are readable by end-users 203, e.g., cognitively disabled, sighted persons who are unable to read Braille or standard alphanumeric characters, such as English language words. Hieroglyphs 19 provide an instruction and direction language for non-text readers which includes and is subject to a set of syntax rules that govern the display and arrangement of hieroglyphs 19. Display 147 presents hieroglyphs 19 to the end-user based on their input, local database record set(s) and programmatic selection structure. The syntax rules control display 147 by specifying graphic content and hieroglyph order based upon standard English language-oriented visualizations and abstractions, e.g., to elicit an action on the part of the user by way of a visual verb, identification of things or places in end-users 203 physical world, i.e., street names, addresses, aisles, shelves, signs, etc., and with which end-users 203 interacts with, or takes action upon. A wide variety of custom hieroglyph symbols may be display concepts and logic as graphic content on display 147 in accordance with the information being decoded from either Braille symbology code 16 or bar code 151. Of course, it will be understood that other written or spoken language may also be used to determine the syntax rules that govern the display and arrangement of hieroglyphs 19, e.g., Japanese, Chinese, Indo-European languages and their root languages, etc. FIGS. 13 and 14 present a small, exemplary portion of a hieroglyph vocabulary used in connection with the present invention. This visual language is developed graphically using exaggerated pantomime, expression, gesture, symbolic posture, motion indicated by "Speed lines", changes in scenery so as to convey changes in location, For example, the "?" hieroglyph is used to present a questioning thought, rather than speech, while background images are presented as a part of a narrative, so that text in the form of Braille codeword 159 or bar code 151 read as an image. The visual treatment of words as graphic art forms is part of the hieroglyphic vocabulary. Comprehension of an image requires commonality of experience, among end-user 203, who will learn to relate this visual graphic language through their experience.

Figure 15:
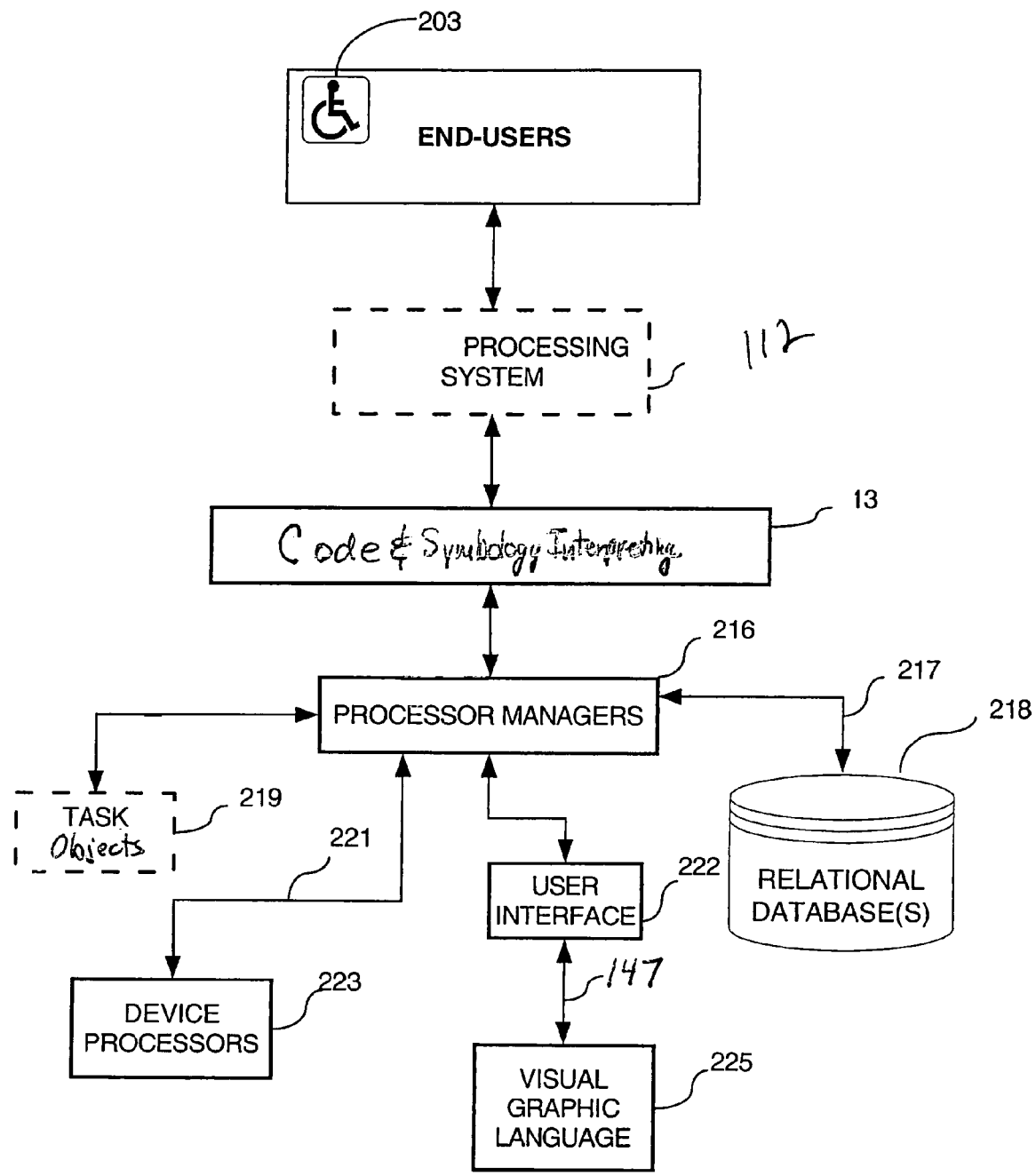
FIG. 15 is a flow chart of code & symbology interpreting system in accordance with one embodiment of the present invention.

Referring to the flow chart of the architecture of the code & symbology interpreting software 13 shown in FIG. 15, end-users 203 who are sighted, but can not read text due to literacy issues, include end-users with cognitive disabilities. End-users 203 engage and interact with system processors 112, e.g., a personal computer, mainframe computer, microcomputer, workstation, server, a portable electronic device such as a personal digital assistant (PDA) via data entry means 100. Code & symbology interpreting software 13 is implemented in the form of a computer software program stored in the memory of a system processor device 112, although such a system could equivalently be provided as an electronic circuit or combination of such circuits. Code & symbology interpreting software 13 is configured based upon the architecture of processing device 112, such as, Client\server, internet, Multi-tier, single user, etc. The software components and interfaces are controlled by a processor managers 216. Task-objects 219 are objects in the environment that end-users 203 must interact with or take action upon. Task-objects 219 are the nouns that are depicted by hieroglyphs 19 that drive the human-machine interaction in the form of a dialog. Processor managers 216 control data exchange with relational databases 218 using SQL commands and, if required by system architecture, connectivity resources. Any relational database 218 can be used with the present invention provided that it accepts SQL commands. Non-limiting examples of relational databases that can be used with the present invention include Microsoft Access, Microsoft SQL Server, and Oracle. Relational database 218 may be a local database or an on-line database. In one embodiment, the database is accessed using Open Database Connectivity (ODBC) by declaring the database as the data source using a Windows ODBC data source administrator. Processor manager 216 may also be part of an internet-based code & symbology interpreting software 13. Connectivity resources 217 for handheld devices using PALM operating systems include PALM conduits for ODBC connection for database synchronization. Windows handheld operating systems also may require ODBC connection for database synchronization. Processor manager 216 controls device processors 223 through interfaces 221. In one embodiment, interfaces 221 comprise Windows API. Processor managers 216 control a User interface 222 that communicates visual graphic language 225 to end-users 203. Display of visual graphic language at section 225 is based on end-users 203 input, local database record set(s) and programmatic selection structure.

Figure 16:
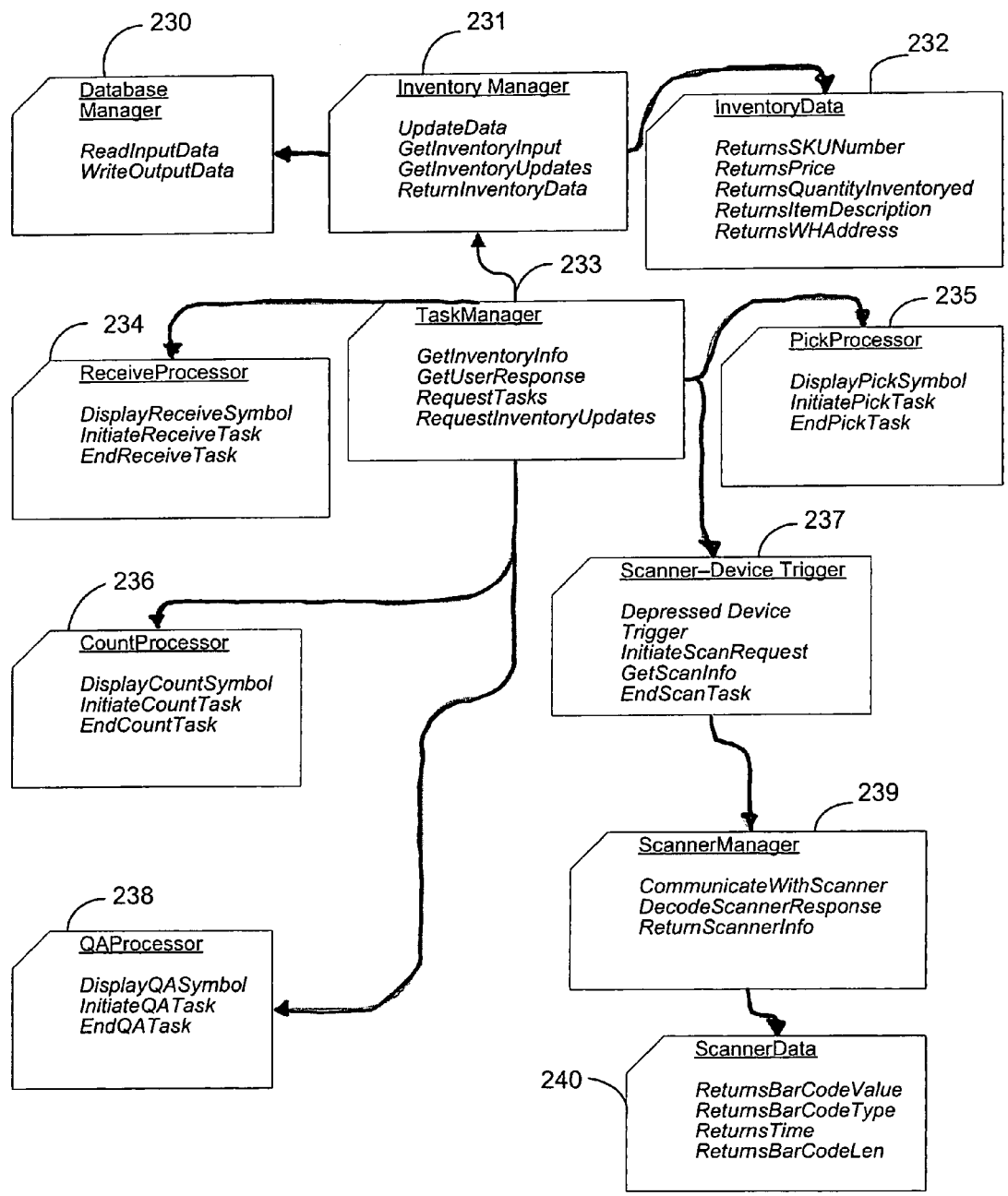
FIG. 16 is a flow chart of one embodiment of a task module for code & symbology interpreting system.

Referring to FIG. 16, presents one exemplary embodiment of a task module for code & symbology interpreting software 13. Processing device 112 architecture in this embodiment is a personal computer and a scan enabled PDA. The connectivity resources include SQL command, ODBC and a handheld synchronization method. The embodiment is a simplified illustration of a task module configured for a cognitively disabled person to work effectively in an inventory control facility at a typical product distribution center. For this embodiment, processor managers 216 are database manager 230, Inventory manager 231, task manager 233 and scanner manager 239. Each processor manager 216 has a controller attribute, and may collaborate within its class. Inventory manager 231 collaborates with database manager 230 to process inventory data 232.

Task manager 233 collaborates with scanner manager 239 via scanner-device trigger 237 to process scanned inputs from end-user 203. Each manager has specific task processes that it controls. Task manager 233 controls a receive processor 234, a pick processor 235, a count processor 236 and a QA processor 238. Scanner manager 239 works with scan decoder 165. As a device processor 223, scanner manager 239 checks for and handles device errors and status. As components of user interface 222, receive processor 234, pick processor 235, count processor 236 and QA processor 238 display syntactically arranged hieroglyphs 19 and directions to end-user 203.

Figure 17:
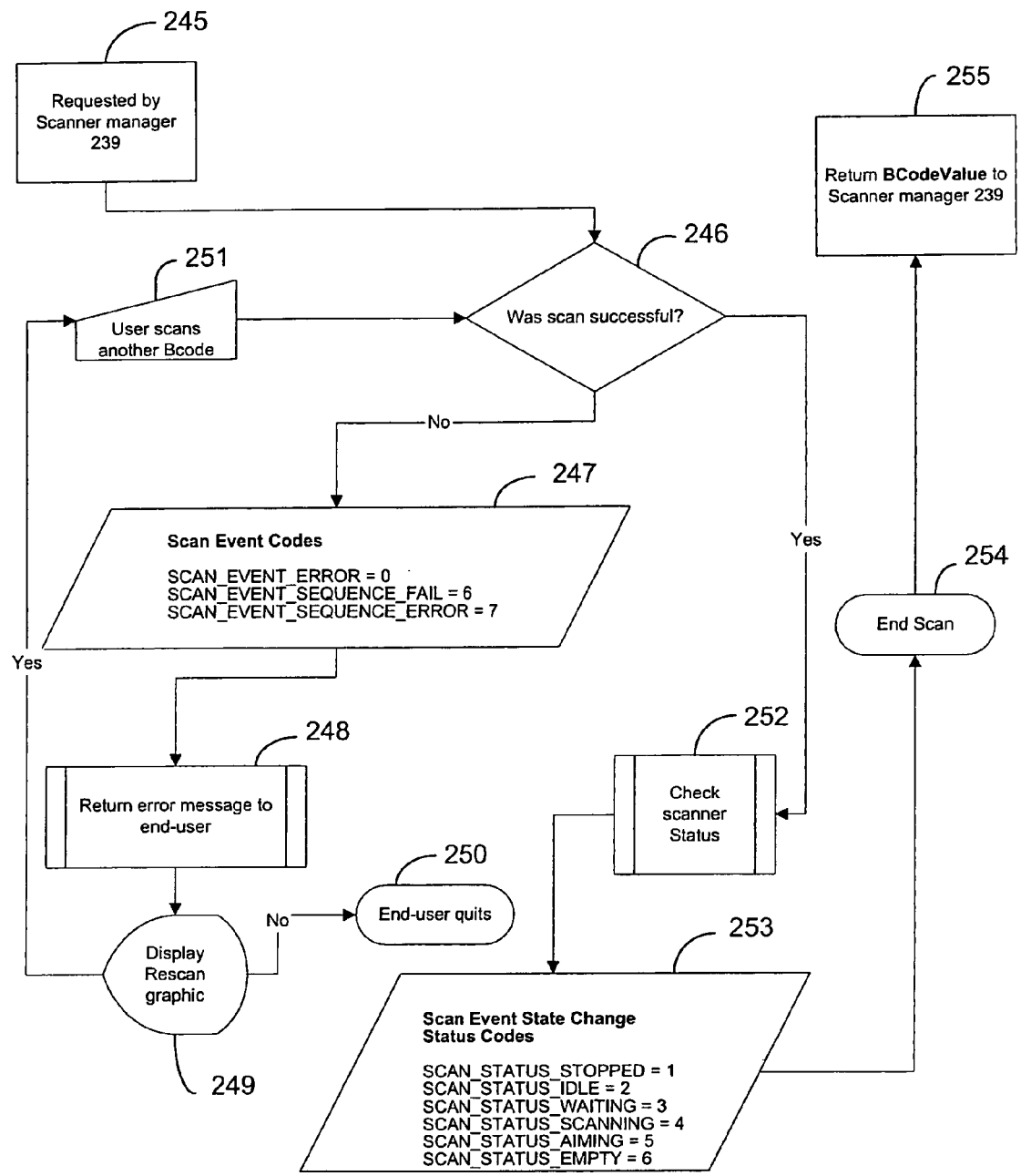
FIG. 17 is a flow chart of hand held scanner error handling for code & symbology interpreting system.

Referring to FIG. 17, a hand held scanner error handling for code & symbology interpreting software 13 comprises scanner manager 239 performing an error and status check for each scan attempt request 245. Test 246 evaluates scan success. If test 246 fails, scan event codes 247 return an error message 248 to end-user 203. In this embodiment, rescan graphic 249 is displayed to end user 203. If end-user 203 quits, the application ends at section 250. If end-user 203 scans another Braille code 159 or bar code 151, generic reference Bcode, as input 251, the process loops to test 246 and continues its evaluation sequence. If test 246 succeeds, a check scanner status 252 is initiated using status event state change codes 253, ending the scan 254 returning the result 255, generic reference, and Bcodevalue to scanner manager 239.

Figure 18:
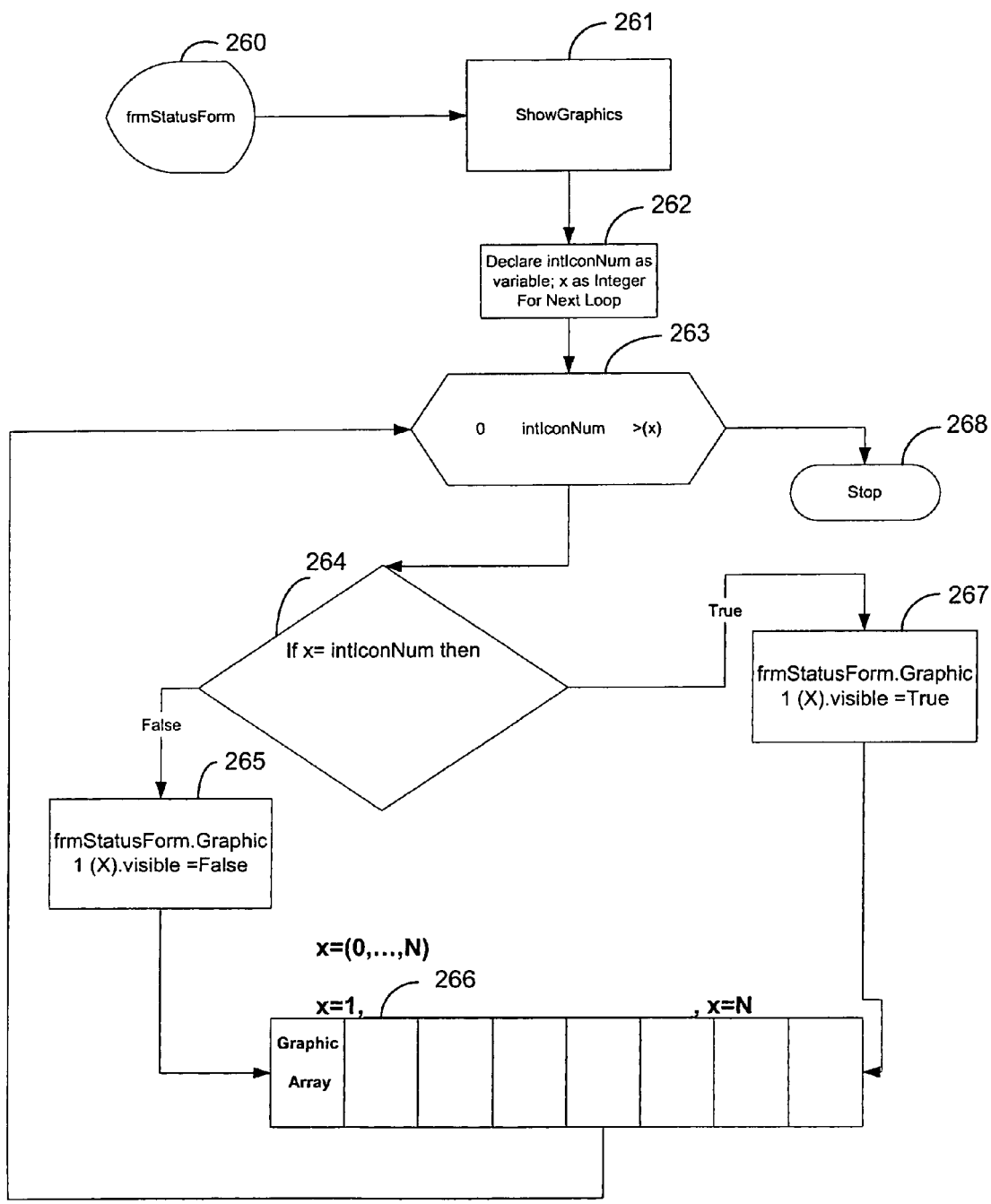
FIG. 18 is a flow chart of one embodiment of the display graphics process for code & symbology interpreting system.

Referring to FIG. 18, a graphics process for code & symbology interpreting software 13 may be prepared or written with a visual basic programming language. However, the present invention can be implemented using a variety of common programming languages such as Visual Basic, C++, C#, Java, etc. Using Visual Basic, frmStatusForm 260 is the Windows based user interface from which show graphics 261 process runs.

Once declare has been set as variable intIconNum and x as Integer 262, the "For Next" loop will continue at section 263 until intIconNum is greater than x, the highest index numbered graphics file in graphic array 266. Within the "For Next" loop, test 264 is initiated to evaluate x=intIconNum. If test 264 is true at section 267, then the graphic file image is visible on frmStatusForm 260. The image is then displayed to end-user 203. If test 264 is false at section 265, then the graphic image is not visible on frmStatusForm 260, and the image is not displayed to end-user 203. The process stops at section 268 when the index exceeds the available graphics in the array. In this embodiment, graphic array 266 stores a subset of hieroglyphs 19. This subset includes task specific hieroglyphs 19 such as pick and receive symbols. Selection of hieroglyphs 19 are based upon the task to be accomplished by end-user 203, and the task-objects 219 being interacted with or acted upon by end-users 203. The show graphics 261 process is used with a menu process for end-users 203 to select processors. The show graphics 261 process may be called by and launched from other processes as well. Show graphics 261 is not a stand-alone process and in another embodiment, no graphics array 266 is used.

Figure 19:
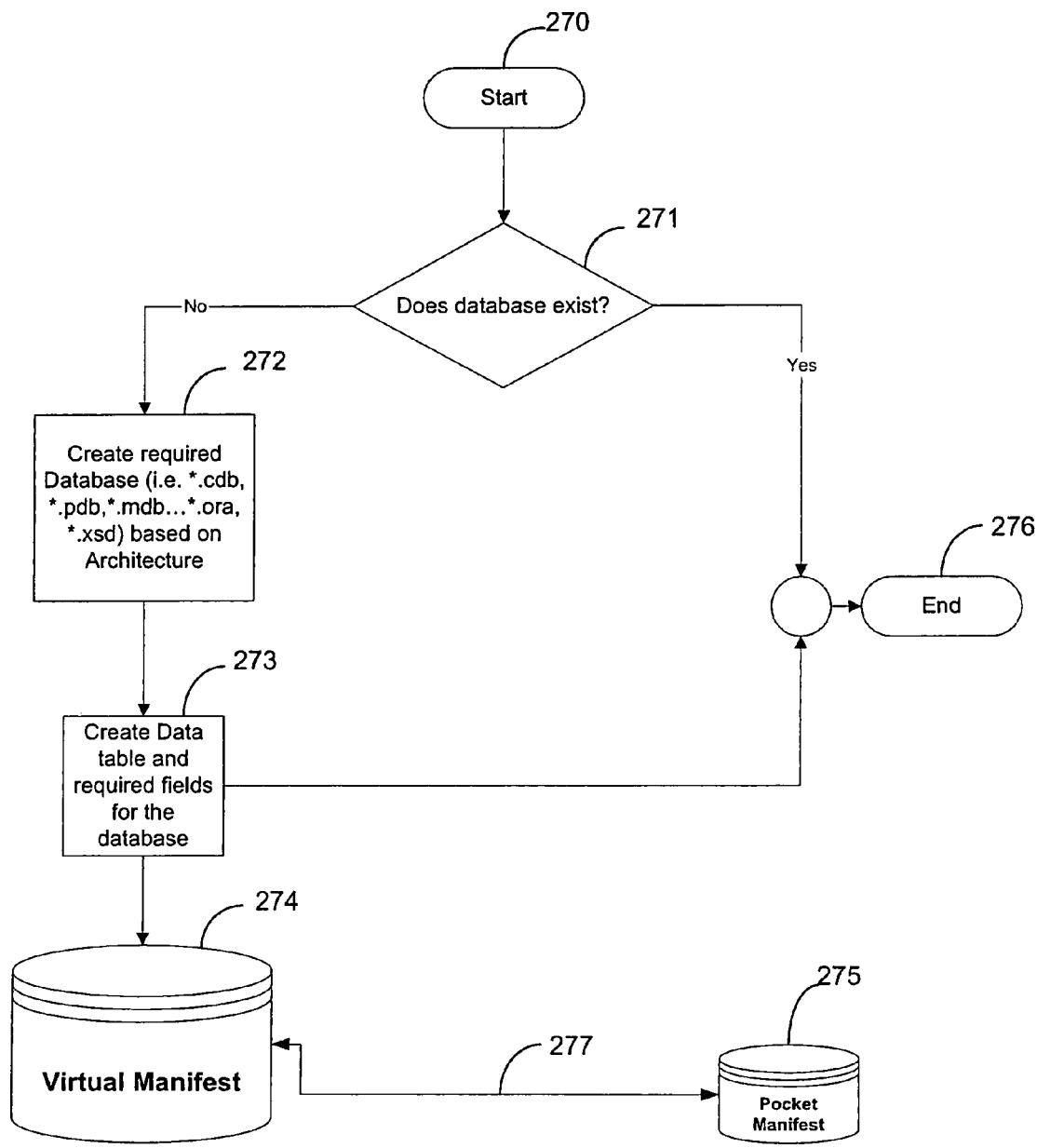
FIG. 19 is a flow chart of relational database structures for code & symbology interpreting system.

Referring to FIG. 19, is a relational database structure for code & symbology interpreting software 13 which includes relational databases 218 to store bar code 151 and Braille code 159 values for use by processor managers 216. A handheld scanner reads bar code 151 or Braille code 159 values and enters them into a required field based on a particular task module. These values may be assigned an equivalent name based on the task module containing it. These fields may be primary key fields for the database table.

In Warehouse management, fulfillment management or inventory control modules, a bar code 151 value for each product can be a SKU (stock keeping unit), product code, UPC code, or other scanner readable product identification value. The quantity field may be called item quantity, Quantity In Warehouse or quantity. For this embodiment of the present invention, in records and warehouse management modules, the primary key fields are the WHAddress and RFAddress. These fields store the text values of scanner data. For illustration, the WHAddress and RFAddress are primary key fields in the warehouse location and records location tables respectively. They are text fields of fixed size. They are also populated to give a specific and unique address to every location in the database. For every record, there must be a Braille coded address in the physical warehouse or record storage facility. End-users 203 will scan Braille codes 159 and use the navigator processor and user interface 100, to navigate their course in the physical warehouse space. The navigator processor shows end-user 203 where to go within the physical warehouse space based on the particular Braille codes 159 that have been scanned. Processor managers 216, relational databases 218, and the task-objects 219 form the dialog 215 of hieroglyphs 19 that instructs and guides end-users 203.

Depending upon the architecture of processing system device 112, relational databases 218 may reside on a server and\or a mobile tier. In this embodiment, relational databases 218 for inventory control, Virtual Manifest 274 reside on a personal computer 112 and a pocket manifest 275 resides on a handheld computer. Connectivity resource 277 facilitates synchronization of database tables. Processor manager 216 requires database information at the start of a process that tests for the existence of the database. Start 270 begins test 271, making a machine code inquiry as to whether the required database exists? If test 271 is answered yes, then the process ends at section 276.

If test 271 is answered no, then the required database is created at section 272 with the required tables and fields 273. In this embodiment, the required database is the Virtual Manifest 274.

Figure 20:
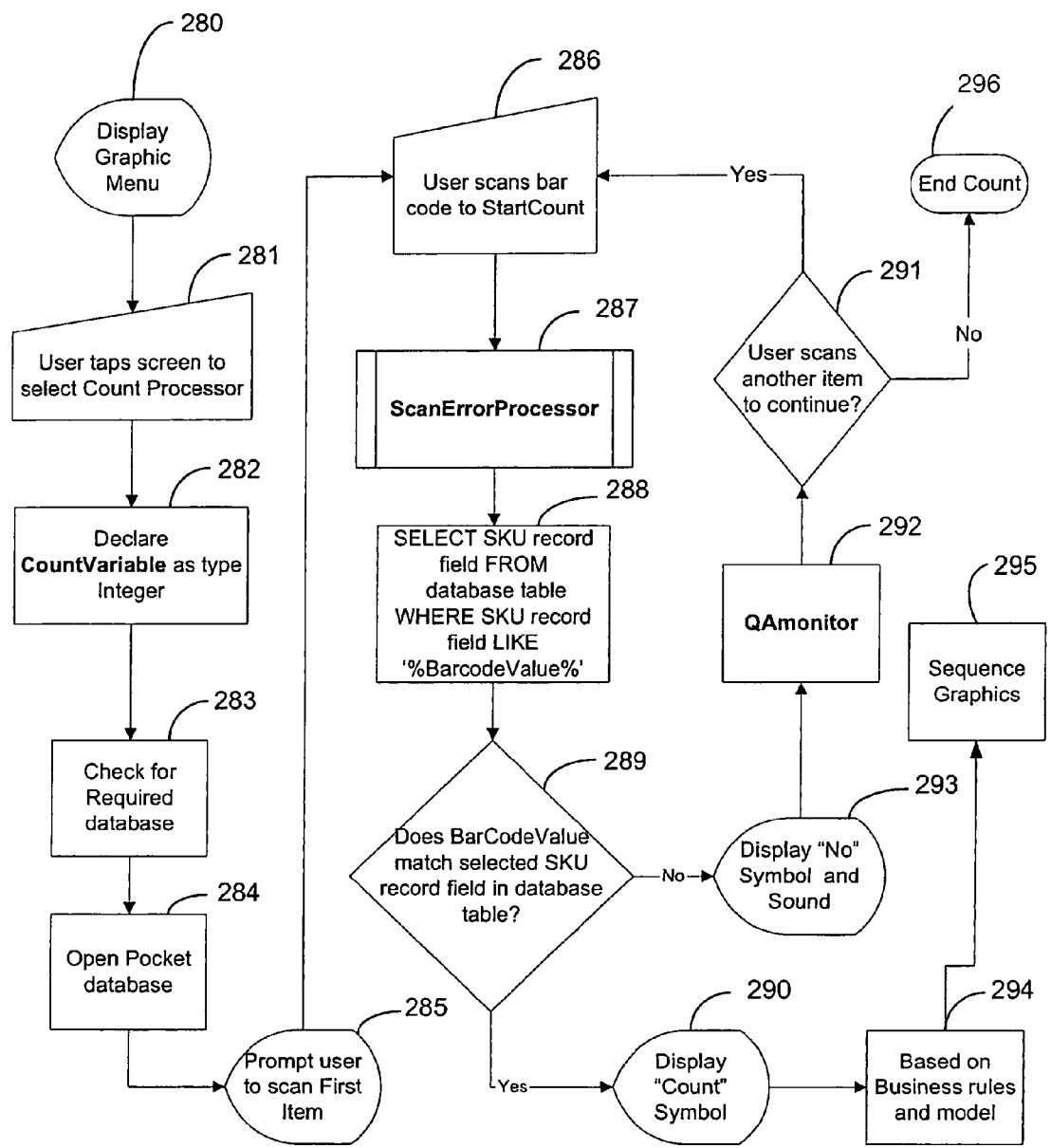
FIG. 20 is a flow chart an embodiment of the Count Processor for the for code & symbology interpreting system.

Referring to FIG. 20, a count processor for the code & symbology interpreting software 13 includes show graphics 261 to process with a menu process to display a graphic menu 280.

End-user 203 taps a touch receptive handheld display screen 147 to select a count processor 281, so as to Declare CountVariable as Integer 282. A Launch process 283 checks for the required database (FIG. 19) and the initiator opens the pocket manifest 284 database. Next, end-user 203 is prompted with one or more hieroglyphs 19 to scan a first item 285. End-user scans a bar code 151 or Braille Code 159 to start count 286. Upon scan attempt, scan error processor 287 engages scanner manager 239 process (FIG. 17). If the scan is successful and end-user 203 does not quit the application, then SQL query 288 retrieves SKU records matching the "%BarcodeValue%". Test 289 evaluates the result of this query. If test 289 fails to match SKU records, then the international symbol for "no" is displayed 293 to end-user 203. The "%BarcodeValue%" is processed by QA monitor 292. The QA monitor adds the unmatched value to a table to log it as a possible end-user 203 error for review. The count processor continues allowing end-user 203 the choice of continuing or ending the application at test 291. If test 291 is answered yes, end-user 203 scans another item and the process loops to 286.

If test 291 is answered no, end-user 203 quits, and the count processor ends at 296. If test 289 succeeds, end-user 203 is instructed to continue counting the item by displaying Count graphic 290. Business rules and model 294 that govern the task assignments of end-users 203 are used to sequence graphics 295 using code & symbology interpreting software 13 syntax, graphic nouns and verbs. Using the count processor, end-users 203 follow the graphic sequence of one or more syntactically arranged hieroglyphs 19 complete task assignments such as item counts, inventory stocking, and inventory audit.

Non-limiting examples of other task modules configurable using this invention are retail store stocking and shopping, records management, order fulfillment, warehouse management, navigating aisles & streets, reading signs etc. Various task modules may be configured based on the needs of the end-users 203.

It is to be understood that the present invention is by no means limited only to the particular constructions herein disclosed and shown in the drawings, but also comprises any modifications or equivalents within the scope of the claims.

What is claimed is:

1. A system for pictorially communicating to sighted persons who cannot read a standard alphanumeric text, the informational content of that text comprising:

data entering means for acquiring alphanumeric text;

encoding means for converting said alphanumeric text into a machine-readable set of informationally corresponding data;

recognition and decoding means for correlating said informational content data set with one or more hieroglyphs that are representative of the actions, physical objects and the relationship between said actions and said physical objects presented by said informationally corresponding data set and arranging said one or more hieroglyphs syntactically to pictorially represent said informationally corresponding data set for said sighted persons thereby to inform said sighted person of said actions, objects and the relationship between said actions and said objects as was originally presented in said standard alphanumeric text; and wherein said machine-readable set of informationally corresponding data comprises a flat Braille symbology.

2. The system according to claim 1 wherein said correlation of said informational content data set with one or more hieroglyphs includes a relational database.

3. The system according to claim 2 wherein said relational database is capable of accepting SQL commands and is at least one of a local database and an on-line database.

4. The system according to claim 1 wherein said flat Braille symbology comprises matrix having two columns of dot-squares by three rows of dot-squares that together represent a single character unit.

5. The system according to claim 4 wherein said dot-squares are identified by a reference character for ease of manipulation as a portion of a data analysis software program.

6. The system according to claim 4 wherein said each character of an alphanumeric text is represented as a unique combination of dot-squares.

7. The system according to claim 4 wherein said matrix comprises a predetermined lateral spacing and a predetermined longitudinal spacing defined between adjacent dot-squares.

8. The system according to claim 4 wherein said matrices are positioned adjacent to one another with a start pattern and a stop pattern positioned therebetween to indicate the beginning and end of each matrix.

9. The system according to claim 4 wherein said information encoded in said matrix represents at least one standard Braille code symbol.

10. The system according to claim 4 wherein said encoding means comprises generation of an electronic signal wherein a signal voltage alternates between two preset voltage levels, one representing a black dot and one representing a white dot such that said alternating pulses of high and low voltage levels correspond to a presence or absence of said black and said white dots in a scan line wherein a sequence of alternating voltage pulses is presented for decoding and creation of said informationally corresponding data set.

11. The system according to claim 10 wherein said data entering means comprises an optical scanner.

12. The system according to claim 1 wherein said data entering means comprise a handheld optical scanner.

13. The system according to claim 1 wherein said data entering means are selected from the group consisting of a keypad, optical scanner, and magnetic card reader.

* * * * *